US010708717B2

(12) United States Patent
Hostyn et al.

(10) Patent No.: US 10,708,717 B2
(45) Date of Patent: Jul. 7, 2020

(54) ELECTRONIC DEVICE AND METHOD FOR DETERMINING A DISTANCE BETWEEN MOBILE DEVICES BASED ON A PROBABILISTIC MODEL

(71) Applicant: Sony Corporation, Tokyo (JP)

(72) Inventors: Tom Hostyn, Stuttgart (DE); Jeroen Ost, Stuttgart (DE); Anatoliy Lubashevskiy, Stuttgart (DE); Olivier Demarto, Stuttgart (DE); Masatomo Kurata, Stuttgart (DE); Sota Matsuzawa, Stuttgart (DE); Serkan Eryilmaz, Stuttgart (DE); Paulius Sarka, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/254,954

(22) Filed: Jan. 23, 2019

(65) Prior Publication Data

US 2019/0239029 A1 Aug. 1, 2019

(30) Foreign Application Priority Data

Jan. 26, 2018 (EP) ..................................... 18153619

(51) Int. Cl.
*H04W 4/024* (2018.01)
*H04W 4/029* (2018.01)
(Continued)

(52) U.S. Cl.
CPC ........... *H04W 4/029* (2018.02); *H04W 4/023* (2013.01); *H04W 4/024* (2018.02); *H04W 4/027* (2013.01); *H04W 68/005* (2013.01)

(58) Field of Classification Search
CPC ..... H04W 4/029; H04W 4/027; H04W 4/024; H04W 68/005; H04W 4/023
See application file for complete search history.

(56) References Cited

U.S. PATENT DOCUMENTS

| 5,423,574 A | 6/1995 | Forte-Pathroff |
| 6,078,260 A | 6/2000 | Desch |

(Continued)

FOREIGN PATENT DOCUMENTS

| CN | 2003168194 A | 6/2003 |
| CN | 202454037 U | 9/2012 |

OTHER PUBLICATIONS

Derek Adams, "The best kids trackers: Using wearables for child safety", May 25, 2016, 15 pages.

(Continued)

*Primary Examiner* — Chuong A Ngo
(74) *Attorney, Agent, or Firm* — Xsensus LLP

(57) ABSTRACT

An electronic device includes a tracking unit that tracks a movement of a first mobile device and a movement of a second mobile device, based on a position of the first mobile device and a position of the second mobile device received from a position estimation unit; a determination unit that determines a probability distribution of a distance between the first mobile device and the second mobile device, based on a probabilistic model, and the position of the first mobile device and the position of the second mobile device; and an action unit that performs action, based on the determined probability distribution of the distance.

20 Claims, 6 Drawing Sheets

(51) Int. Cl.
*H04W 4/02* (2018.01)
*H04W 68/00* (2009.01)

(56) References Cited

U.S. PATENT DOCUMENTS

2017/0357788 A1* 12/2017 Ledvina .................. G06F 21/31
2019/0182627 A1*  6/2019 Thoresen ................ H04L 67/04

OTHER PUBLICATIONS

Kay Tan, "Top 5 Mobile Apps to Keep your Kids Safe", Hongkiat, Jul. 27, 2016, 3 pages.
Wikipedia, "Rice distribution", Jan. 13, 2018, 7 pages.
Wikipedia, "Rayleigh distribution", Jun. 26, 2017, 3 pages.
Android Devepolers, "Public Class Location", Web Archive, Jan. 2018, 28 Pages.

* cited by examiner

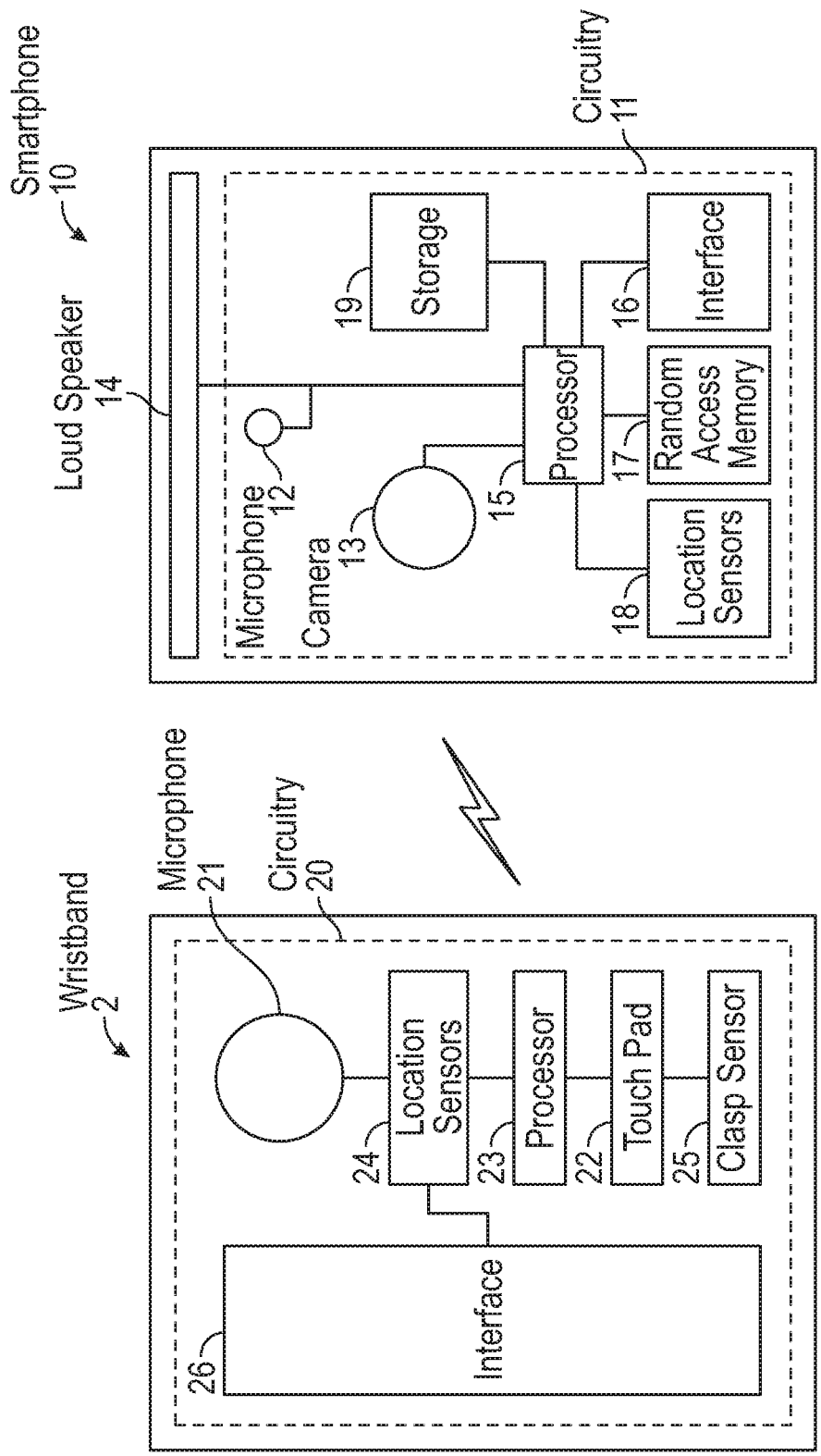

US 10,708,717 B2

ELECTRONIC DEVICE AND METHOD FOR DETERMINING A DISTANCE BETWEEN MOBILE DEVICES BASED ON A PROBABILISTIC MODEL

CROSS-REFERENCE TO RELATED APPLICATION

The present application claims priority to European Patent Application 18153619.4 filed by the European Patent Office on 26 Jan. 2018, the entire contents of which being incorporated herein by reference.

TECHNICAL FIELD

The present disclosure generally pertains an electronic device and a method for determining a distance between at least two electronic devices.

TECHNICAL BACKGROUND

Known electronic devices such as smartphones, wearable devices, e.g. wristbands, are used for obtaining a location information, for example, of a trusted contact such as a family member, a friend, etc.

For tracking of such devices it is known to estimate distances between different electronic devices, e.g. electronic devices of parents and their child(ren). Further it is known to issue a notification in cases where the distance of an electronic device worn by a child exceeds, for example, a predefined threshold.

Although generally known techniques for obtaining location information of an electronic device exist, it is desirable to improve methods and electronic devices pertaining to determining locations.

SUMMARY

According to a first aspect, the disclosure provides an electronic device including a tracking unit configured to track a movement of a first mobile device and a movement of a second mobile device, based on a position of the first mobile device and a position of the second mobile device received from a position estimation unit; a determination unit configured to determine a probability distribution of a distance between the first mobile device and the second mobile device, based on a probabilistic model, and the position of the first mobile device and the position of the second mobile device; and an action unit configured to perform action, based on the determined probability distribution of the distance.

According to a second aspect, the disclosure provides a method including tracking a movement of a first mobile device and a movement of a second mobile device, based on a position of the first mobile device and a position of the second mobile device received from a position estimation unit; determining a probability distribution of a distance between the first mobile device and the second mobile device, based on a probabilistic model, and the position of the first mobile device and the position of the second mobile device; and performing action, based on the determined probability distribution of the distance.

Further aspects are set forth in the dependent claims, the following description and the drawings.

BRIEF DESCRIPTION OF THE DRAWINGS

Embodiments are explained by way of example with respect to the accompanying drawings, in which:

FIG. 3 schematically illustrates the wristband of FIG. 2;

FIG. 4 schematically illustrates the smartphone of FIG. 2;

DETAILED DESCRIPTION OF EMBODIMENTS

Figure 2:
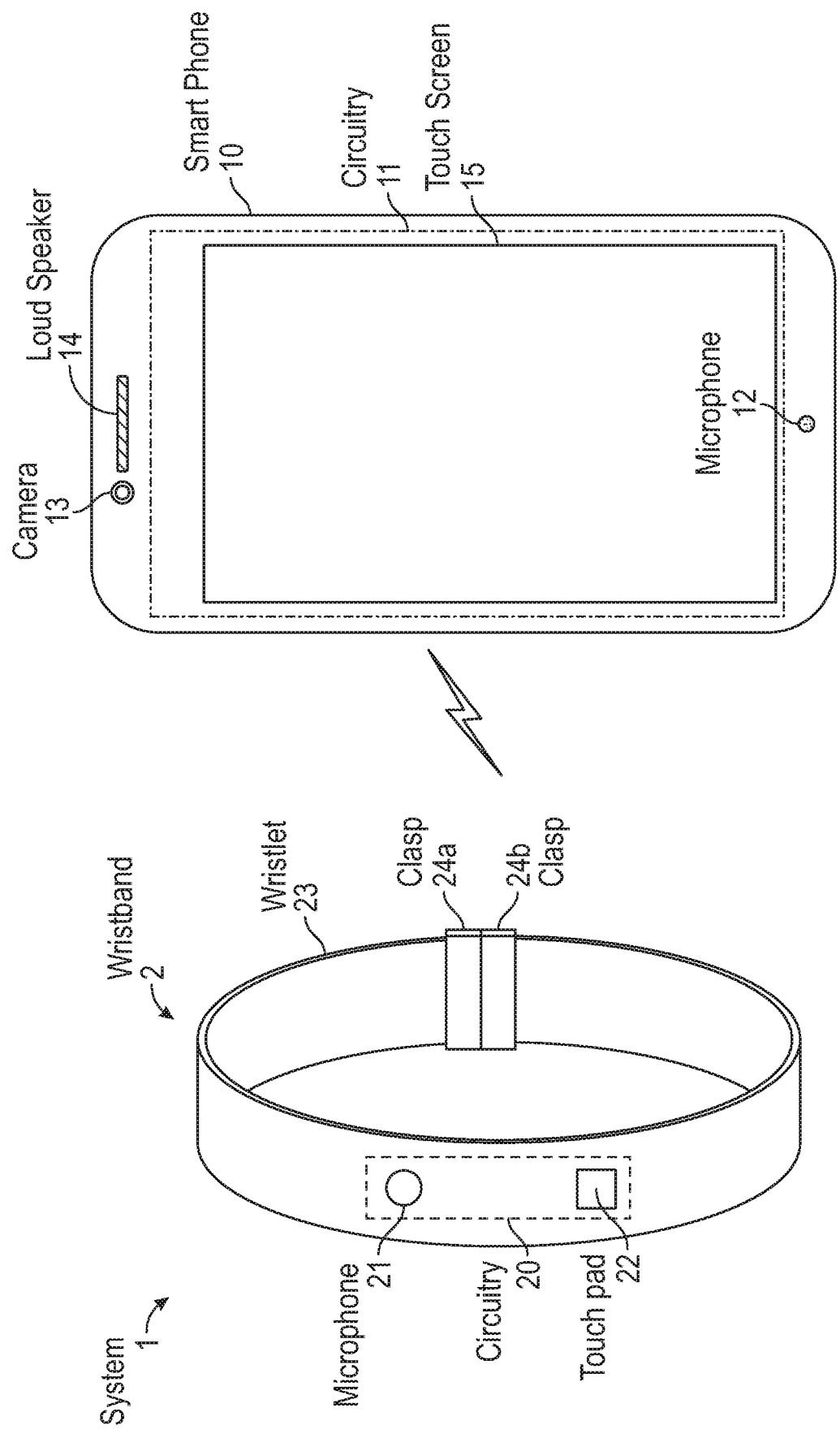
FIG. 2 illustrates an embodiment of a system with a smartphone and a wristband.

Before a detailed description of the embodiments under reference of FIG. 2 is given, general explanations are made.

As also indicated in the outset, mobile devices, such as smartphones, mobile phones, tablet computers, smart watches, wristbands, or the like may contain different location sensors for estimating their location information and they are used, for example, for tracking a location of an electronic device which is worn by a user, such as a child.

As mentioned, in some embodiments, for example, it may be required to determine a distance between different electronic devices and, for example, to issue a notification or the like, e.g., when the distance between two electronic devices is above a threshold, because, e.g. a child ran away from its parents, wherein the child and at least one of the parents wears an electronic device and the distance between the devices is determined.

However, it has been recognized that the determination of the distance between two or more electronic device may be difficult under specific circumstances, since, for example, the determination of the locations of the electronic devices may be inaccurate (e.g. since a global positioning signal is currently unavailable, or only one or two satellites are visible, such that accuracy is decreased etc.), the determined location may be out-of-date (e.g. a global positioning signal is currently not available), etc.

Thus, some embodiments pertain to an electronic device, for example, having a circuitry including a tracking unit configured to track a movement of a first mobile device and a movement of a second mobile device, based on a position of the first mobile device and a position of the second mobile device received from a position estimation unit; a determination unit configured to determine a probability distribution of a distance between the first mobile device and the second mobile device, based on a probabilistic model, and the position of the first mobile device and the position of the second mobile device; and an action unit configured to perform action, based on the determined probability distribution of the distance.

The electronic device and/or the first mobile device and/or the second mobile device may be a smartphone, a tablet computer, a mobile computer (laptop, notebook or the like), a digital camera, a wearable device such as a smartwatch, a wristband, an intelligent glass, a neckband, an electronic patch or any other electronic device which is mobile.

In some embodiments, the first mobile device and the second mobile device may be based on similar type of devices, for example, both devices may be smartphones. In some embodiments, the first mobile device and the second mobile device may be based on different types of devices, for example, the first mobile device may be based on a smartphone and the second mobile device may be based on a wristband. Moreover, the first mobile device such as the smartphone may be carried by a parent, a teacher, a care taker, etc., and the second device such as the wristband may be carried by a child, a student, an elderly person, etc., without limiting the present disclosure in that regard.

The circuitry may include a processor, a memory (RAM, ROM or the like), a storage, input means, output means, a wireless interface, etc., as it is generally known for electronic devices such as a smartphone, a wearable device, etc.

As mentioned, the electronic device can be a smartphone, mobile station, wearable device, smart watch, mobile phone, table pc, digital camera or the like or any other type of mobile electronic device.

In some embodiments, the electronic device may be the first mobile device and/or the second mobile device and/or a server device and/or an application running on the cloud, etc.

In the following, the electronic device and a method is described based on an embodiment of a system wherein the first mobile device is a smartphone and the second mobile device is a wearable device (also named a wristband), without limiting the present disclosure in that regard. Moreover, the method may be performed by the smartphone and/or the wearable device described herein. Furthermore, a probability distribution of a distance between the smartphone (i.e. the first mobile device) and the wearable device (i.e. the second mobile device) may be determined, based on a probabilistic model, and the position of the first mobile device and the position of the second mobile device.

In some embodiments, the electronic device may further include a nearby detection unit configured to determine whether the first mobile device and the second mobile device are nearby, based on determining a nearby probability, which is computed based on the probability distribution of the distance for distances below a nearby distance threshold.

The nearby probability for a nearby distance threshold between the smartphone and the wearable device, may represent a measure of a degree to which an occurrence (e.g. having a nearby distance threshold) is certain.

In some embodiments, the probabilistic model may be based on, for example, a Bayesian probability model as it is generally known to a skilled person.

In some embodiments, the probabilistic model may include a prior probability distribution representing a distribution before evaluating location data of the first mobile device and the second mobile device, and a posterior probability distribution representing a distribution after evaluating the location data of the first mobile device and the second mobile device.

For example, the prior probability distribution may be or may represent a distribution for the distance between the mobile device and the wearable device, before taken into account the location data of the smartphone and the wearable device.

In some embodiments the prior probability distribution may be estimated based on a half-Cauchy function. The half-Cauchy function is generally known to the skilled person.

Figure 1A:
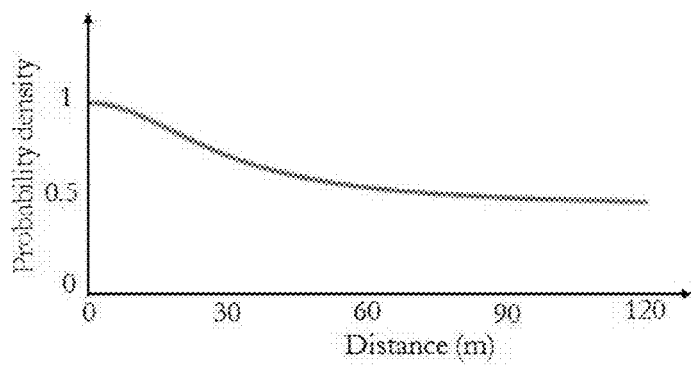
FIG. 1a illustrates an embodiment of a method for determining a prior probability distribution based on a half-Cauchy function.

FIG. 1a illustrates an embodiment of a method performed by the circuitry of the electronic device, e.g. its determination unit wherein the prior probability distribution is estimated based on a half-Cauchy function, wherein the ordinate is indicative of a probability density value and the abscissa is indicative of a distance between, for example, two electronic mobile devices. As can be taken from FIG. 1a, in this example, the prior probability has a maximum at small distances and a long tail of a probability of roughly 50% for large distances.

In some embodiments, the location data of the smartphone and the wearable device may not be available (at least for some time). Moreover, the prior probability distribution may be estimated, e.g., based on a half-Cauchy function, and a prior probability distribution may be estimated to be approximately 0.5.

Moreover, the posterior probability distribution may be or may represent a distribution for the distance between the mobile device and the wearable device, after taken into account the location data of the smartphone and the wearable device.

In some embodiments, the location data, for example, the position of the first mobile device and the position of the second mobile device may be received from a position estimation unit. Moreover, the circuitry, e.g. the tracking unit in the circuitry may track the movement of the first mobile device (e.g. the smartphone) and the movement of the second mobile device (e.g. the wearable device).

The location data may be or may represent position information of the first mobile device (e.g. the smartphone) and position information of the second mobile device (e.g. the wearable device). The position information may directly and/or absolutely indicate the position of the mobile device and the wearable device, respectively, or it may indirectly indicate the position of the mobile device and the wearable device, respectively.

A direct and absolute indication of a position may include a direct position and absolute coordinates, such as Global Positioning System (GPS) coordinates or the like, while an indirect and non-absolute indication of a position may include a relative position, which may indicate a position change with respect to a certain start position and/or start time, such that also movement patterns or the like are also considered as position information. Moreover, location data and/or the position information may be in the form of digital data, digital or analog sensor signals, map-position data, etc.

In some embodiments, the position information of the mobile device and the wearable device may be obtained independently from each other. For example, the mobile device may be configured to determine its own positon information. Besides, the wearable device may determine its position information independently from the mobile device. Hence, in some embodiments, the first and/or the second mobile device is adapted to determine its location, e.g., from their corresponding position estimation units.

The mobile device and/or the wearable device may include respective means of position estimation units, e.g. sensors, which provide signals or data which are indicative of the position and/or position change of the mobile device and the wearable device, respectively. Such sensors may be, for example, position sensors such as a GPS sensor providing an absolute position information, acceleration sensors providing acceleration information, gyroscopic sensors providing angle information, magnetometers providing magnetometer information, etc. The mobile device and/or the wearable device may also obtain the mobile device/wearable device position information from a source, which provides such information. For example, an indoor position system may determine the position of the mobile device/wearable device based on a wireless communication with the respective mobile device and/or wearable device, as it is generally known, and may provide the respective information to the mobile device and/or wearable device.

In some embodiments, the mobile device and the wearable device may record the GPS position, and may also record other background signals, e.g. strength of wireless communication stations, background audio, etc. Hence, in some embodiments, it is possible to execute the method and estimate a probability for a distance even in GPS deprived areas such as indoors, or the like.

In some embodiments, it is possible to adapt the probabilistic method based on the location data obtained from different indoor navigation standards, for example, peer to peer signals such as an Ultra-Wide band (UWB) navigation system, a Bluetooth Low Energy (BTLE) navigation system, or the like.

In some embodiments, the position information of the first mobile device and the position information of the second mobile device may include at least one of a latitude, a longitude, an attitude, and an accuracy parameter.

For example, the smartphone and/or the wearable device may determine their current geo location, based on different sensors incorporated in the devices, e.g., a GPS (Global Positioning System) module, a wireless communication network, etc., and may further provide a fused location provider (FLP) location such as a simple access point information (API) which includes, for example, a latitude, a longitude, an attitude, and an accuracy parameter, for the current location.

Moreover, the position estimation unit may estimate and may further report a real-time position of the first mobile device and a real-time position of the second mobile device. Furthermore, the tracking unit may be able to track the movement of the first mobile device and the second device based on the obtained real-time positions, as it is generally known to the skilled person.

In some embodiments, the position estimation units may be parts of the two mobile devices and may send the real-time positions of the first mobile device and the second mobile device to the electronic device. Furthermore, the electronic device, for example, the tracking unit of the electronic device may collect the estimated positions and may further store them in a database. Moreover, the tracking unit may further use the stored position information (e.g. obtained at a short time window of approximately 15 min) and may track the movement of the mobile devices, etc.

In some embodiments, the posterior probability distribution may be estimated based on the prior probability distribution. For example, the posterior probability distribution may be estimated based on the prior probability distribution and evaluating the location data of the smartphone and the wearable device, according to following equation:

$$\text{Posterior probability distribution} \sim \text{Likelihood function} \times \text{Prior probability distribution}, \quad (1)$$

wherein, the "Likelihood function" is a function representing the location data of the smartphone and the wearable device.

In some embodiments there might be several likelihood functions in the probabilistic model included, for example, there might be a first likelihood function, and a second likelihood function. Moreover, in some embodiments, the posterior probability distribution is estimated based on a first likelihood function and a second likelihood function.

In some embodiments, the first likelihood function may be defined in terms of a density function for calculating a distance probability density based on a position information of the first mobile device and a position information of the second mobile device.

For example, the first likelihood function may be defined in terms of a density function of the provided locations (i.e. a latitude, a longitude, and an accuracy parameters) using the following equation:

$$\text{First likelihood function } (d) = f(l\_1, l\_2 | d), \quad (2)$$

wherein the $l_1$, and $l_2$ are the provided location information such as the fused location provider (FLP), for the first mobile device (e.g. the smart phone) and the second mobile device (e.g. the wearable device), respectively. Moreover, the $l_1$, and $l_2$ may be substituted by the position information which is represented by the longitude, the latitude, and the accuracy parameters. Therefore, the first likelihood function is equal to the following conditional density function:

$$f(lon_1, lat_1, acc_1, lon_2, lat_2, acc_2 | d), \quad (3)$$

wherein the $lon_1$, $lat_1$, and $acc_1$, are the provided longitudes, latitudes, and accuracies for the first mobile device (e.g. the smartphone) and the $lon_2$, $lat_2$, and $acc_2$ are the provided longitudes, latitudes, and accuracies for the second mobile device (e.g. the wearable device), respectively, and the condition is that the first mobile device is located at a distance of d meters away from the second mobile device.

Furthermore, the coordination of the above equation (3) may be transformed to the Euclidean plane, wherein due to the translational and the rotational symmetries, the following equation may be obtained:

$$f(0, 0, acc_1, 0, h, acc_2 | mob_1 \text{ is at } (0, 0), mob_2 \text{ is at } (0, d), \text{ translated, rotated}), \quad (4)$$

wherein, h is the haversine distance between $(lon_1, lat_1)$ and $(lon_2, lat_2)$. Moreover, with the assumption that the $acc_1$ and $acc_2$ are independent from the distance (d), the above equation (4) may be stated as:

$$f((0, 0), (0, h) | mob_1 \text{ is at } (0, 0) \text{ with } acc_1, mob_2 \text{ is at } (0, d) \text{ with } acc_2, \text{ translated, rotated}). \quad (5)$$

Moreover, in some embodiments, "$mob_1$ is at $(0, 0)$ with $acc_1$", represents the position of the first mobile device being distributed according to a two dimensional normal distribution with a $(0, 0)$ mean, and a diagonal $(\sigma_1^2, \sigma_2^2)$ covariance matrix, for some value of $\sigma_1^2$, corresponding to $acc_1$, and "$mob_2$ is at $(0,0)$ with $acc_2$", represents the position of the second mobile device being distributed according to a two dimensional normal distribution with a $(0, d)$ mean, and a diagonal $(\sigma_1^2, \sigma_2^2)$ covariance matrix, for some value of $\sigma_2^2$, corresponding to $acc_2$, hence the above equation (5) may be converted to:

$$f(d=h | mob_1 \sim \text{Normal}((0, 0), (\sigma_1^2, \sigma_1^2)), mob_2 \sim \text{Normal}((0, d), (\sigma_2^2, \sigma_2^2))), \quad (6)$$

Moreover, in some embodiments, with the assumption that a distribution of the distance between two points from two normal distributions may be equal to a length of a vector sampled from the difference of these two distributions, the above equation (6) may be converted to:

$$f(|w|=h|w \sim \text{Normal}((0, d), (\sigma_1^2+\sigma_2^2, \sigma_1^2+\sigma_2^2)). \quad (7)$$

Furthermore, the above equation (7) may represent a Rice distribution, and it may further be converted to:

$$\text{Rice}(d, (\sigma_1^2+\sigma_2^2)^{1/2}) \cdot \text{pdf}(h), \quad (8)$$

wherein, the pdf(h) is the value of the probability density function at h. Moreover, in some embodiments, the accuracy may be considered a number, for example, with a probability of 0.68, a distance from the true location to the measurement, may be smaller than the accuracy.

Moreover, with the assumption that the measurement may be randomly distributed around the true location according to a normal distribution with a diagonal covariance of ($\sigma^2$, $\sigma^2$), consequently, the distance may be distributed according to a Rayleigh($\sigma$) distribution. Hence, in some embodiments, the accuracy may be considered to be equal to 0.68 quantile of the Rayleigh ($\sigma$) distribution:

$$\text{acc}=\sigma \times \sqrt{-2 \times \log(1-0.68)}, \quad (9)$$

Figure 1B:
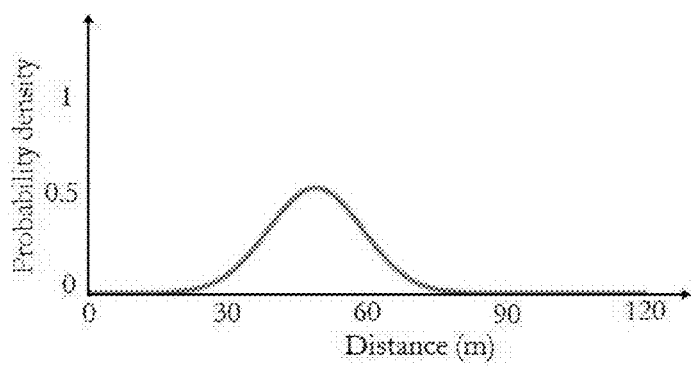
FIG. 1b illustrates an embodiment of a method for determining a first likelihood function based on position information of a first mobile device and position information of a second mobile device.

FIG. 1b illustrates an embodiment of a method performed by the circuitry of the electronic device, wherein the first likelihood function is estimated based on a Rice distribution and wherein the accuracy is considered to be equal to 0.68 quantile of a Rayleigh ($\sigma$) distribution. FIG. 1b illustrated on the ordinate a probability value and on the abscissa a distance, wherein a maximum is shown at roughly 50 m.

Hence, in some embodiments, it may be possible to estimate the first likelihood function, based on a Rice distribution function according to $$\text{Rice}(d, (\sigma_1^2+\sigma_2^2)^{1/2}) \cdot \text{pdf}(h), \quad (10)$$

wherein d is a distance between the first mobile device and the second mobile device, $\sigma_1$ is a variance parameter corresponding to an accuracy parameter for the position information of the first mobile device, $\sigma_2$ is a variance parameter corresponding to an accuracy parameter for the position information of the second mobile device, and pdf(h) is the value of the probability density function of a haversine distance between the locations of the first mobile device and the second mobile device.

As mentioned, the posterior probability distribution may be estimated based on the second likelihood function. In some embodiments, the second likelihood function may include a density function for calculating a density of wireless communication stations, based on detected wireless communication stations by the first mobile device and the second mobile device.

For example, the second likelihood function may be defined in terms of a density function of the observed wireless communication stations (wcs) using the following equation:

$$\text{Second likelihood function } (d)=P(wcs_1, wcs_2|d), \quad (11)$$

wherein, the $wcs_1$ and the $wcs_2$, are the wireless communication stations detected by the first mobile device (e.g. the smartphone) and the second mobile device (e.g. the wearable device), respectively. Moreover, the variables $wcs_1$ and $wcs_2$ are sets of names of visible wireless communication stations.

Furthermore, the additional parameters of the probabilistic model may be defined as:
r is a radius of the wireless communication detection area;
$\lambda$ is a density of the wireless communication stations;
A is a number of the wireless communication stations detected only by the first mobile device;
B is a number of the wireless communication stations detected only by the second mobile device
C is a number of the wireless communication stations detected by both of the first mobile device and the second mobile device; and In some embodiments, the first mobile device and (or) the second mobile device may be configured to detect all of the wireless communication stations within the detection area with a radius of r. Furthermore, it may be assumed that the wireless communication stations in an area of s(m$^2$) are distributed according to a Poisson distribution such as Poisson ($\lambda \times s$).

It may further be assumed that the parameters of, b, c, and d are the observed values of A, B, C, and D, respectively. Hence, in some embodiments it is possible to compute the P(a, b, c|d) for estimating the second likelihood function.

In some embodiments, the first mobile device and the second mobile device may are able to detect the wireless communication stations that are located, for example, in a circle (i.e. circular area) with a radius of r. Additionally, the area of the circle may be estimated as $\pi r^2$. Of course, any other types of areas and shapes of areas may be used, e.g. rectangular, elliptic, etc.

Moreover, the first mobile device and the second mobile device may be able to detect common wireless communication stations that are located in an intersection of two circles with radius of r, and the distance between the first mobile device and the second mobile device may be d meters.

The area of the intersection $\sigma_{dr}$, may be estimated according to following equation:

$$\theta_{dr} = \begin{cases} 2r^2\cos^{-1}(d/2r) - d/2\sqrt{4r^2 - d^2}, & d \le 2r \\ 0, & d > 2r \end{cases} \quad (12)$$

Furthermore, in some embodiments, the three areas including the area having wireless communication stations that are detectable only by the first mobile device, the area having wireless communication stations that are detectable only by the second mobile device, and the area having wireless communication stations that are detectable by both of the first mobile device and the second mobile device, may not intersect, hence, the second likelihood function may split to the following equation:

$$P(a, b, c|d)=P(a|d) \times P(b|d) \times P(c|d), \quad (13)$$

Each of the multipliers in equation (13) may be distributed according to a Poisson distribution, wherein the following equations may be derived:

$$P(a|d)=\text{Poisson}(\lambda \times (\pi r^2 - \theta_{dr})) \cdot pmf(a) \quad (14)$$

$$P(b|d)=\text{Poisson}(\lambda \times (\pi r^2 - \theta_{dr})) \cdot pmf(b) \quad (15)$$

$$P(c|d)=\text{Poisson}(\lambda \times \theta_{dr}) \cdot pmf(c), \quad (16)$$

wherein, the pmf(x) is the value of the probability mass function at x.

Hence, in some embodiments, a Poisson distribution is considered and a probability mass function may be determined for the variable parameters. Furthermore, the following equation may be derived:

$$p(a|d) = \frac{\lambda^a(\pi r^2 - \theta_{dr})^a}{a!} e^{-\lambda(\pi r^2 - \theta_{dr})}, \quad (17)$$

-continued $$P(b|d) = \frac{\lambda^b (\pi r^2 - \theta_{dr})^b}{b!} e^{-\lambda(\pi r^2 - \theta_{dr})}, \quad (18)$$

$$P(c|d) = \frac{\lambda^c \theta_{dr}^c}{c!} e^{-\lambda \theta_{dr}}, \quad (19)$$

By substituting equation (17), (18) and (19) in equation (13), the second likelihood function may be calculated as:

$$P(a, b, c | d) = \frac{\lambda^a (\pi r^2 - \theta_{dr})^a}{a!} e^{-\lambda(\pi r^2 - \theta_{dr})} \times \quad (20)$$

$$\frac{\lambda^b (\pi r^2 - \theta_{dr})^b}{b!} e^{-\lambda(\pi r^2 - \theta_{dr})} \times \frac{\lambda^c \theta_{dr}^c}{c!} e^{-\lambda \theta_{dr}},$$

In some embodiments, a probability of exp(−100) is assigned for the observations with c>0 and d>2r.

In some embodiments, the second likelihood function may further be defined up to a multiplicative constant (and its logarithm up to an additive constant), and the posterior probability distribution may further be normalized.

Hence, in some embodiments it is possible to computationally simplify the logarithm of the second likelihood function by omitting the terms that are independent of distance d, according to following equation:

$$\log p(a, b, c|d) = (a+b) \times \log(\pi r^2 - \theta_{dr}) + c \times \log(\theta_{dr}) + \lambda \times \theta_{dr}, \quad (21)$$

Figure 1C:
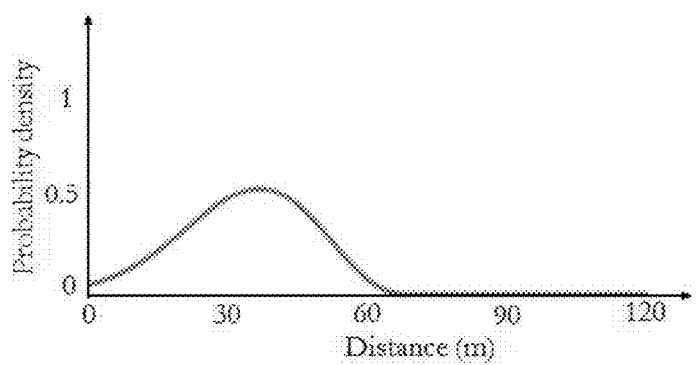
FIG. 1c illustrates an embodiment of a method for determining a second likelihood function based on detected wireless communication stations by a first mobile device and a second mobile device.

FIG. 1c illustrates an embodiment of a method in which the second likelihood function is determined based on detected wireless communication station by the first mobile device and the second mobile device. FIG. 1c illustrates probability values on the ordinate and a distance on the abscissa. A maximum is located at a distance of roughly 35 m.

Hence, in some embodiments, it is possible to estimate the second likelihood function, based on $$\log p(a, b, c|d) = (a+b) \times \log(\pi r^2 - \theta_{dr}) + c \times \log(\theta_{dr}) + \lambda \times \theta_{dr}, \quad (22)$$

wherein p(a, b, c|d) is the second likelihood function, a is an observed value for a number of the wireless communication stations detected only by the first mobile device, b is an observed value for a number of the wireless communication stations detected only by the second mobile device, c is an observed value for a number of the wireless communication stations detected by both of the first mobile device and the second mobile device, r is is a radius of the wireless communication detection area, and θ is a geometric function for an area of intersection having wireless communication stations that are detectable by both the first mobile device and the second mobile device.

As mentioned, in some embodiments, the posterior probability distribution function is estimated based on a prior probability distribution and a likelihood function.

Moreover, in some embodiments, the posterior probability distribution may be or may represent the probability distribution of the distance between the first mobile device and the second mobile device.

Figure 1D:
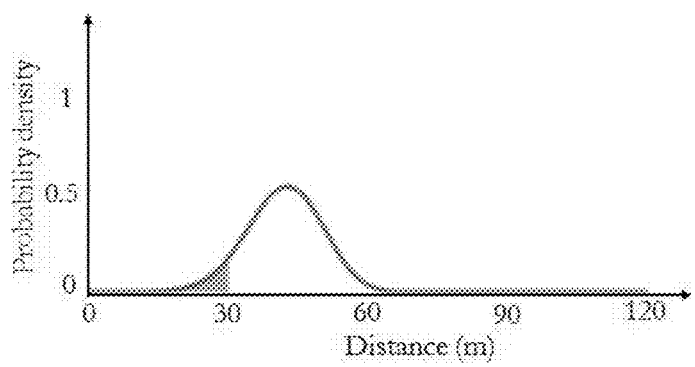
FIG. 1d illustrates an embodiment of a method for determining a posterior probability distribution based on a prior probability distribution, a first likelihood function and a second likelihood function.

FIG. 1d illustrates an embodiment of a system wherein the posterior probability distribution function is determined by the circuitry of the electronic device, e.g. by its determination unit, based on the prior probability distribution function, a first likelihood function, and a second likelihood function. FIG. 1d illustrates probability values on the ordinate and a distance on the abscissa. A maximum is located at a distance of roughly 35 m. Moreover, a grey shaded area illustrates a distance interval from 0 to 30 m representing distances below a nearby distance threshold of 30 m for which the probability is integrated in order to determine a nearby probability that the distance between the first and second mobile device is within the defined distance interval.

In some embodiments, the nearby probability is computed based on a cumulative density function of the posterior probability distribution.

For example, the posterior probability distribution may be determined based on the prior probability distribution, the first likelihood function and the second likelihood function. Moreover, the cumulative distribution function (CDF) of the posterior probability distribution may be evaluated and the nearby probability for the distance between the first mobile device and the second mobile device may be computed. The nearby probability for the distance between the first mobile device and the second mobile device may represent the probability that the second mobile device is located at the nearby distance threshold of d or a distance smaller than d, from the first mobile device.

Hence, in some embodiments, a nearby probability may be computed, e.g., based on the probability distribution of the distance for distances below a nearby distance threshold, moreover, it may be determined whether the first mobile device and the second mobile device are nearby.

In some embodiments, the determination of nearby may include determining whether the determined nearby probability is above a nearby probability threshold.

For example, the nearby probability may be computed, and moreover, if the nearby probability is above or under a nearby probability threshold, for example, 0.9 (i.e. being the nearby probability threshold), a nearby may be determined and an action may be performed.

The action may be: sending an alert notification to the parent device (e.g. the smartphone), pushing a talk button, performing a wireless communication, and/or tracking a movement, etc.

In some embodiments, the action unit may further be configured to perform an action based on a tracking result provided by the tracking unit.

For example, in some embodiments the electronic device, e.g., its nearby detection unit may determine a nearby. Moreover, the first mobile device and/or the second mobile device may move and the tracking unit may track the movement of the first mobile device and the second mobile device. Moreover, nearby detection unit may further determine another nearby (i.e. a nearby state) for distances below a nearby distance threshold. Furthermore, the action unit may perform an action based on the tracking result, for example, the first mobile device and the second mobile device may not be in nearby state and the action unit may provide an alert notification.

In some embodiments, the position estimation unit may further be configured to estimate a movement speed of the first mobile device and a movement speed of the second mobile device.

In some embodiments, the electronic device may further be configured to adapt its definition of nearby (i.e. the nearby distance threshold) depending on the situation, e.g., in a moving car, the relative speeds are taken into account, or the like.

In some embodiments, a distance may be estimated, based on a nearby distance threshold, a movement speed of the first mobile device, and a movement speed of the second mobile device.

For instance, in some embodiments, the first mobile device and/or the second mobile device may be carried, e.g., by corresponding users in a mobile vehicle, a user riding a bicycle, etc. Hence, it may be required to evaluate a distance corresponding to a real time and, e.g., taking a movement speed into account.

In some embodiments, the electronic device and/or its circuitry may further be configured to estimate the movement speed of the first mobile device and/or the second mobile device. For instance, the last available position information which is record, e.g., by using Kalman filter on the location record history may be used, as it is generally known to the skilled person. Moreover, a Standard Kalman filter with three hidden states (position, velocity and acceleration) may be used.

In some embodiments, the resulting speed may be integrated heuristically in the nearby model, it may be used to increase the nearby distance threshold in prior, and determining the nearby probability according to the following equation:

$$\text{Distance (real time)} = \text{nearby distance threshold} \times \text{speed} \quad (23)$$

In some embodiments, the nearby detection unit may further be configured to determine whether the first mobile device and the second mobile device are nearby, based on the estimated movement speed of the first mobile device and the estimated movement speed of the second mobile device.

In some embodiments, the action unit may further be configured to provide an alert notification, based on the nearby detection unit determining whether the first mobile device and the second mobile device are nearby.

In some embodiments, the action unit may further be configured to provide a navigation instruction. For example, the navigation instruction may be provided when the nearby detection unit determining the first mobile device and the second mobile device are not nearby. Moreover, the navigation instruction may include a direction instruction from a position of the first mobile device to a position of the second mobile device.

In some embodiments, the electronic device may further be configured to alert people if children leave (or arrive to) a place rather than a person.

In some embodiments, the electronic device may further be configured to require at least two adults to be present in a group of ten children, and alert if that is not the case, for example, when one adult is leaving the nearby distance threshold, or the like.

In some embodiments, there may be a GPS deprived environment, and the electronic device may further be configured to recognize historical location fingerprint patterns, and indicate that the child is at the location where the parent was 15 minutes ago.

In some embodiments, e.g., when a child gets lost, the electronic device may further be configured to notify any (predefined) adult who is closest to the child using the wearable device, and ask the adult to assist him/her to find the parents.

In some embodiments, the action unit may further be configured to determine a state for the first mobile device and the second mobile device, based on the position of the first mobile device, the position of the second mobile device, the movement speed of the first mobile device, and the movement speed of the second mobile device.

The state may be, for example, a movement state where the mobile device (e.g. the first mobile device and/or the second mobile device) is moving, a drive state, a rigid state, a nearby state, a non-nearby state, or the like, without limiting the present disclosure to a particular state of the first mobile device and/or the second mobile device.

In some embodiments, the electronic device may further include a communication interface which may be configured to establish a wireless communication between the first mobile device and the second mobile device.

The wireless communication between the smartphone (i.e. first mobile device) and the wearable device (i.e. the second mobile device) may be provided via Bluetooth (e.g. also BLE=Bluetooth Low Energy), Near Field Communication (NFC) or the like. The establishment of the wireless communication between the smartphone and the wearable device may include the pairing of the mobile device and the wearable device, etc.

For example, in some embodiments, it is possible for parents to be notified when a child goes too far away. For example, parents (father, mother or both) or any other responsible person may carry the first mobile device (e.g. a smartphone) and the children may carry their respective wearable devices (i.e. the second mobile devices). Moreover, a beacon technology may be used to detect whether the family is together. For example, parents may be alerted when a child is left behind and may further get assistance in bringing the family back together.

Furthermore, alerts may only be triggered when necessary. For example, in some embodiments, children may be handed over to other trusted adults seamlessly, e.g., by connecting other adult's mobile devices and selecting it to be the first mobile device in the probabilistic model, or the like.

In some embodiments, it may be possible for the family member to understand each other's situation by providing a corresponding communication per messages or the like.

For instance, a scalable Internet of things cloud service may keep track of where everyone is, who they are with, etc., and a glance at an application displaying corresponding information, e.g. on a smartphone, is all it takes to know the precise location, or general situation of each other.

In some embodiments, a wearable device may track the location and other parameters and, thus, the circumstances of a child and may alert when necessary, e.g., temperature, humidity, exposure to sunlight for too long, etc.

In some embodiments, the predefined action may be a notification, which is sent when family members do not arrive in expected destinations (e.g. at expected point of time). For example, parents may be notified e.g., when a child arrives at the playdate's home, or when they arrive to school late, or when the mother misses the bus and will be late for dinner, etc.

In some embodiments, the electronic device may be configured to help parents to, for example, keep track of their children, keep track of where all the family members are, find their lost children in a crowd, create a virtual proximity fence that will alert parents when children are wandering off, alert when the children have arrived in a designated safe zone, etc. Moreover, in some embodiments, the electronic device may be configured to allow for multiple caretakers. For example, multiple electronic devices may be selected to perform the function of the first mobile device and/or the second mobile, etc.

In some embodiments, the family members may visualize and may further keep track of how much time they are spending in various places, and how much time they are spending with each other, or the like, which may be implemented based on corresponding computer programs running on an electronic device.

In some embodiments, a multitude of clients may periodically send their location data to a server. The server may further determine who is close to each other and who is not. Moreover, an alert may be sent as a predefined action, and may further indicate that a child has left the care of a parent, since, for example, the determined distance is above a predefined threshold.

Hence, in some embodiments, it is possible, for example, to naturally expand the method to many parents/caretakers and many children, to seamlessly hand over care from one parent to the other without raising alarms when one parent leaves the area but the child stays with the other, to notify not only the parent close to the child, but also other caretakers. For example, in a busy park, the father goes to buy an ice cream and leaves mother and child and then, the child runs away. In this example, both parents are notified immediately and can look for the child.

Some embodiments pertain to a method including tracking a movement of a first mobile device and a movement of a second mobile device, based on a position of the first mobile device and a position of the second mobile device received from a position estimation unit; determining a probability distribution of a distance between the first mobile device and the second mobile device, based on a probabilistic model, and the position of the first mobile device and the position of the second mobile device; and performing action, based on the determined probability distribution of the distance. The method may further include determining whether the first mobile device and the second mobile device are nearby, based on determining a nearby probability, which is computed based on the probability distribution of the distance for distances below a nearby distance threshold.

The method may be performed by the electronic device (or its circuitry) as discussed herein, by the first mobile device, by the second mobile device, by a processor, computer, tablet computer, server, remote server, smartphone, or the like, or any other type of electronic device.

As discussed above, determining the nearby may include determining whether the determined nearby probability is above a nearby probability threshold.

The method may further include performing an action based on a tracking result provided by the tracking unit. Moreover, a movement speed of the first mobile device and a movement speed of the second mobile device may be estimated. The method may further include determining whether the first mobile device and the second mobile device are nearby, based on the estimated movement speed of the first mobile device and the estimated movement speed of the second mobile device. Moreover, an alert notification may be provided, based on the nearby detection unit determining whether the first mobile device and the second mobile device are nearby. As discussed above, a navigation instruction may be provided. Moreover, the navigation instruction may be provided when the nearby detection unit determining the first mobile device and the second mobile device are not nearby, and the navigation instruction may include a direction instruction from a position of a first mobile device to a position of a second mobile device. The method may further include establishing a wireless communication between the first mobile device and the second mobile device. As discussed above, a probabilistic model may be used, the probabilistic model may include a prior probability distribution representing a distribution before evaluating location data of the first mobile device and the second mobile device, and a posterior probability distribution representing a distribution after evaluating the location data of the first mobile device and the second mobile device.

The methods as described herein are also implemented in some embodiments as a computer program causing a computer and/or a processor (circuitry) to perform the method, when being carried out on the computer and/or processor (circuitry). In some embodiments, also a non-transitory computer-readable recording medium is provided that stores therein a computer program product, which, when executed by a processor (circuitry), such as the processor (circuitry) described above, causes the methods described herein to be performed.

Returning back to FIG. 2, an embodiment of a system 1 including an electronic device (right side in FIG. 2) is illustrated which is a smartphone 10 (see also FIG. 4). The smartphone 10 communicates with a wearable device 2 (left side in FIG. 2), which is a wristband 2 (see also FIG. 2) in the present embodiment. Without limiting the disclosure in that regard, in the following embodiments the disclosure is illustrated based on a smart phone as a first mobile device and a wristband as a second mobile device.

The smartphone 10 has a circuitry 11, which is further illustrated in FIG. 4 and which is discussed in more detail further below.

The circuitry 11 has a microphone 12, and a camera 13. The camera 13 is CMOS based (complementary metal oxide semiconductor) in this embodiment, without limiting the present disclosure in that regard.

The smartphone 10 also has a loudspeaker 14 on the top for outputting sound, e.g. also for communicating with the user, and a touch screen 15.

The wristband 2 has a circuitry 20, which has a microphone 21 and a touch sensitive area 22 which is a touch pad 22 for receiving user inputs. The circuitry 20 is illustrated in FIG. 3 and discussed in more detail further below.

The smartphone 10 and the wristband 2 can communicate via a wireless link, which can be provided over a wireless local area network, Bluetooth, or the like.

Moreover, the wristband 2 has a wristlet 23, which can be closed via two clasps 24a and 24b.

In the following, the circuitry 20 of the wristband 2 is schematically described under reference of FIG. 3.

The circuitry 20 has a processor 23 (including one or more processors), which is coupled to the microphone 21, to the touch pad 22, to location sensors 24, a clasp sensor 25 and an interface 26.

The location sensors 24 are able to determine a location of the wristband 2. In the present example, it includes a GPS (global positioning sensor) and a UWB sensor for determining indoor location, as also discussed above, without limiting the present disclosure in that regard.

The clasp sensor 25 is able to detect, whether the two clasps 24a and 24b are closed or not, e.g. based on a magnetic force sensor or a mechanical sensor, as it is generally known.

The interface 26 is able to perform a wireless communication (Bluetooth and wireless local area network) and a wired communication, in this example over universal serial bus, without limiting the disclosure in that regard.

Thereby, the smartphone 10 and the wristband 2 can communicate wirelessly with each other.

In the following, the circuitry 11 of the smartphone 10 is schematically described under reference of FIG. 4.

The circuitry 11 also has a processor 15 (including one or more processors), which is coupled to a microphone 12, the camera 13, the loudspeaker 14, an interface 16, a random access memory (RAM) 17, location sensors 18, and a storage 19 which is a hard disk in this embodiment, without limiting the disclosure in that regard.

In some embodiments, the smartphone 10 has additional input means, e.g. a keyboard, mouse, touch pad, or the like, and additional output means, e.g. a display, LEDs, or the like.

The interface 16 is able to perform communication over wire and wirelessly (Bluetooth and wireless local area network), such that it can communicate with the Internet, a (home) network, electronic devices, such as the wristband 2, etc.

The location sensors 18 are able to determine a location of the smartphone 10. In the present example, it includes a GPS (global positioning sensor) and a UWB sensor for determining indoor location, as also discussed above, without limiting the present disclosure in the regard.

Figure 5:
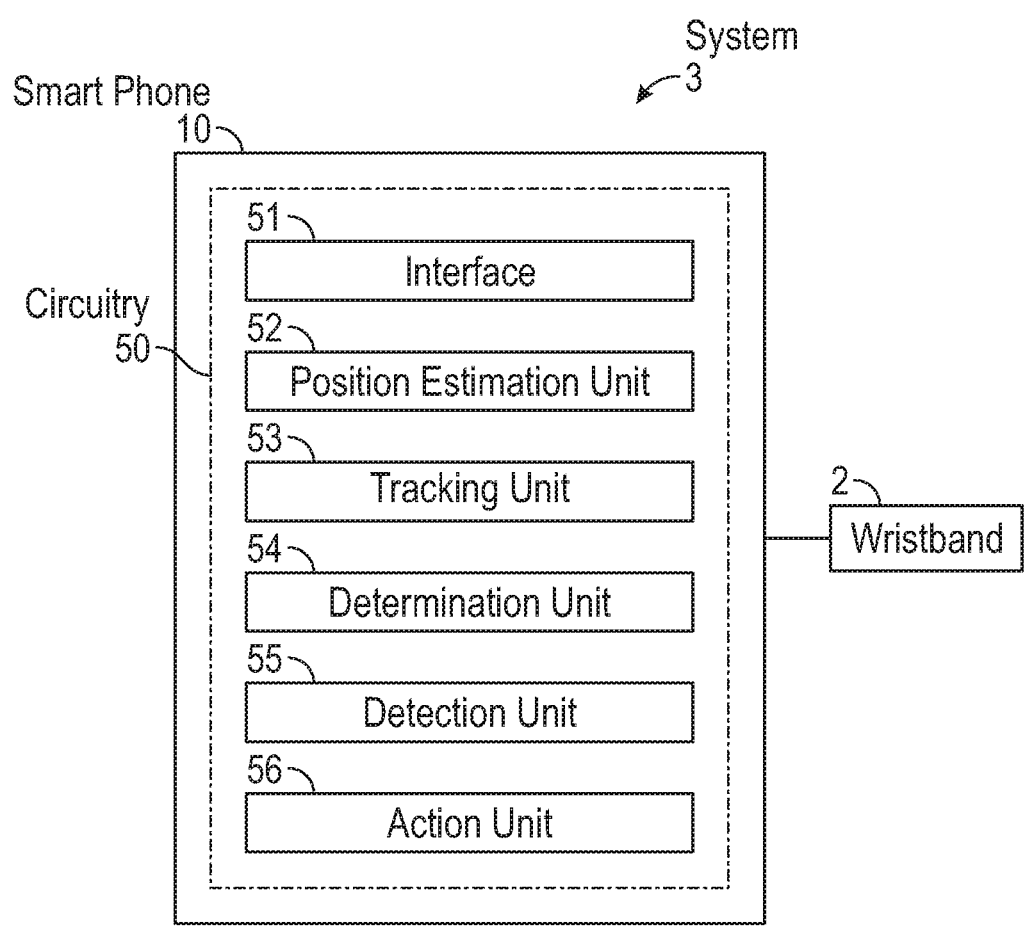
FIG. 5 schematically illustrates an embodiment of a system including a smartphone including functional units and a wearable device.

FIG. 5 illustrates an embodiment of a system 3 including an electronic device, namely a smartphone 10 and a wristband 2, wherein both smartphone 10 and wearable device 2 are similar to the smartphone 10 and the wearable device 2 of FIG. 1.

The smartphone 10 has a circuitry 50 which includes an interface 51, a position estimation unit 52, a tracking unit 53, a determination unit 54, a nearby detection unit 55, and an action unit 56.

The interface 51 connects the smartphone 10 to the wearable device 2, as discussed above. The interface 51 may connect the smartphone 10 and the wearable device 2 to each other and may keep them connected before, during and after movement, for example, from a nearby distance threshold to a distance interval above the nearby distance threshold, as also discussed above. The interface 51 is also configured to obtain data, e.g., position information and/or location data from the wearable device 2, which has sensors and provides different data, as discussed above.

The position estimation unit 52 receives the position of the smartphone 10 and the wearable device 2. Moreover, the tracking unit 53 in the circuitry 50 tracks the movement of the smartphone 10 and the wearable device 2, as discussed above.

For example, the smartphone 10 and the wearable device 2 may have different sensors, e.g., Global Positioning System (GPS) sensors, and the position estimation unit 52 may receive the position information of the smartphone and position information of the wearable device 2, as discussed above.

Furthermore, the position estimation unit 52 converts the obtained position information of the first mobile device and the position information of the second mobile device to a latitude, a longitude, an attitude, and an accuracy parameter, as discussed above.

The determination unit 54 determines a probability distribution of a distance between the smartphone 10 and the wearable device 2.

For example, the determination unit 54 estimates a posterior probability distribution based on a prior probability distribution and the position information of the smartphone 10 and the wearable device 2 which is obtained from the position estimation unit 52.

The nearby detection unit 55 determines whether of the smartphone 10 and the wearable device 2 are nearby. For example, the nearby detection unit 55 determines a nearby probability, which is computed based on the probability distribution of the distance for distances below a nearby distance threshold of 30 m between the smartphone 10 and the wearable device 2.

Moreover, the circuitry includes an action unit 56 which performs different actions.

For example, the nearby detection unit 55 determines a state that the smartphone 10 and the wearable device 2 are not nearby. Moreover, the action unit 56 send a navigation instruction to the smartphone 10 which includes a direction instruction from the position of the smartphone 10 to the position of the wearable device 2.

Figure 6:
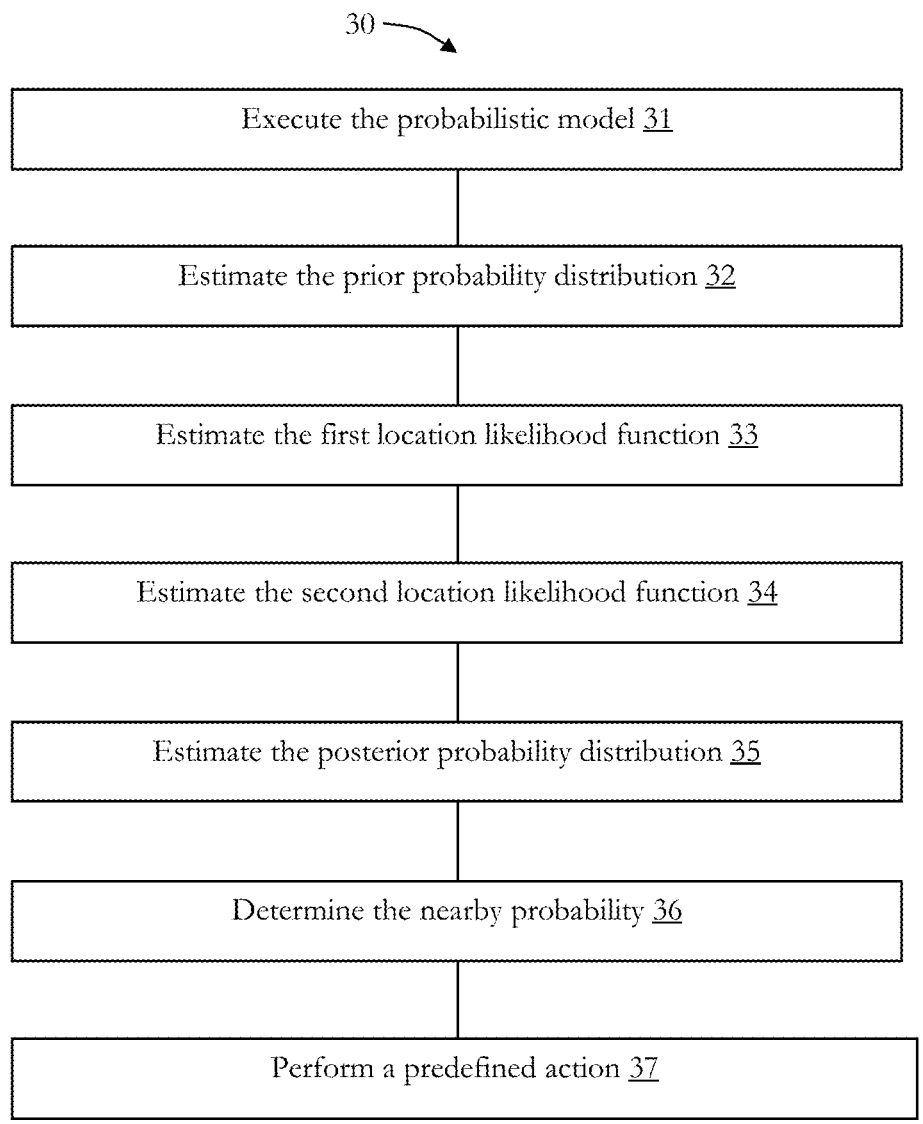
FIG. 6 is a flowchart of an embodiment of a method for determining a probability for a distance between a smartphone and a wristband, based on a probabilistic model.

In the following, a method 30 is illustrated under reference of FIG. 6. The method 30 may be performed by the smartphone 10, the wristband 2, or by another electronic device such as a server, without limiting the present disclosure.

In the following the method 30 is performed by the circuitry 11 (e.g. a program running on the circuitry) of the smartphone 10, wherein a nearby distance threshold of 30 meter between the smartphone 10 and the wristband 2 is considered.

The smartphone 10 determines its position information (e.g. by the location sensors) and provides it to the circuitry 11. Moreover, the wristband 2 also determines its position information and provides it to the circuitry 11.

At 31, the program running on the circuitry 11 executes the probabilistic model. The probabilistic model is based on a nearby algorithm which includes a full Bayesian model (as also discussed in detail above).

The circuitry 11 analyzes the obtained position information of the smartphone 10 and the wristband 2. The position information of the smartphone 10 and the wristband 2 are determined based on a plurality of sensors and the program running on the circuitry converts the obtained data to a longitude, a latitude and an accuracy parameter.

At 32, the program running on the circuitry 11 estimates the prior probability distribution. The program running on the circuitry 11 estimates the prior probability distribution based on a half-Cauchy function.

The prior probability distribution does not include the position information of the first mobile device and the second mobile device and it is only estimated based on the half-Cauchy function.

At 33, the circuitry 11 estimates the first likelihood function. The program running on the circuitry 11 evaluates position information of the first mobile device and position information of the second mobile device. Moreover, the circuitry 11 (e.g. the program running on the circuitry) estimates an accuracy parameter ($\sigma_1$) for the position information of the first mobile device, an accuracy parameter ($\sigma_2$) for the position information of the second mobile device, and a probability density function of a haversine distance between the first mobile device and the second mobile device, as discussed above.

Furthermore, the running program estimates the first likelihood function based on a Rice distribution function. The equation (10) is used for the Rice distribution function.

At 34, the circuitry 11 estimates the second likelihood function.

The smartphone 10 and the wristband 2 determine a set of the wireless communication stations which are detectable by each of them. The circuitry 11 obtains two sets of wireless communication stations which are detectable by the smartphone 10 and the circuitry 2.

The program running on the circuitry 11 analyzes the obtained set(s) of wireless communication stations, and determines a number of the wireless communication stations which are detected only by the smartphone 10, a number of the wireless communication stations which are detected only by the wristband 2, and a number of the wireless communication stations which are detected by both of the smartphone 10 and the wristband 2.

Moreover, the running program on the circuitry 11 estimates the geometric function for an area of intersection and estimates the second likelihood function, based on the equation (22).

At 35, the circuitry 11 estimates the posterior probability distribution. The program running on the circuitry estimates the posterior probability distribution by multiplying the estimated prior probability distribution (i.e. estimated at 32) and the first likelihood function (i.e. estimated at 33) and the second likelihood function (i.e. estimated at 34).

At 36, the circuitry 11 determines the probability for the distance between the smartphone 10 and the wristband 2. The program running on the circuitry 11 estimates the cumulative density function of the posterior probability distribution (i.e. estimated at 35) and determines the nearby probability for the nearby distance threshold.

Moreover, the circuitry determines a probability of 0.1 for the nearby distance threshold of 30 meter between the smartphone and the wristband.

At 37, the circuitry 11 performs a predefined action. The program running on the circuitry evaluates the probability of 0.1 for the distance of 30 meter. The determined probability of 0.1 meets a predefined criterion which is for probabilities to be less than 0.5.

Moreover, the program running on the circuitry sends a notification alert to the smartphone 10 as a predefined action.

The user of the smartphone 10 communicates to the wristband 2 and provides a navigation direction.

Figure 7:
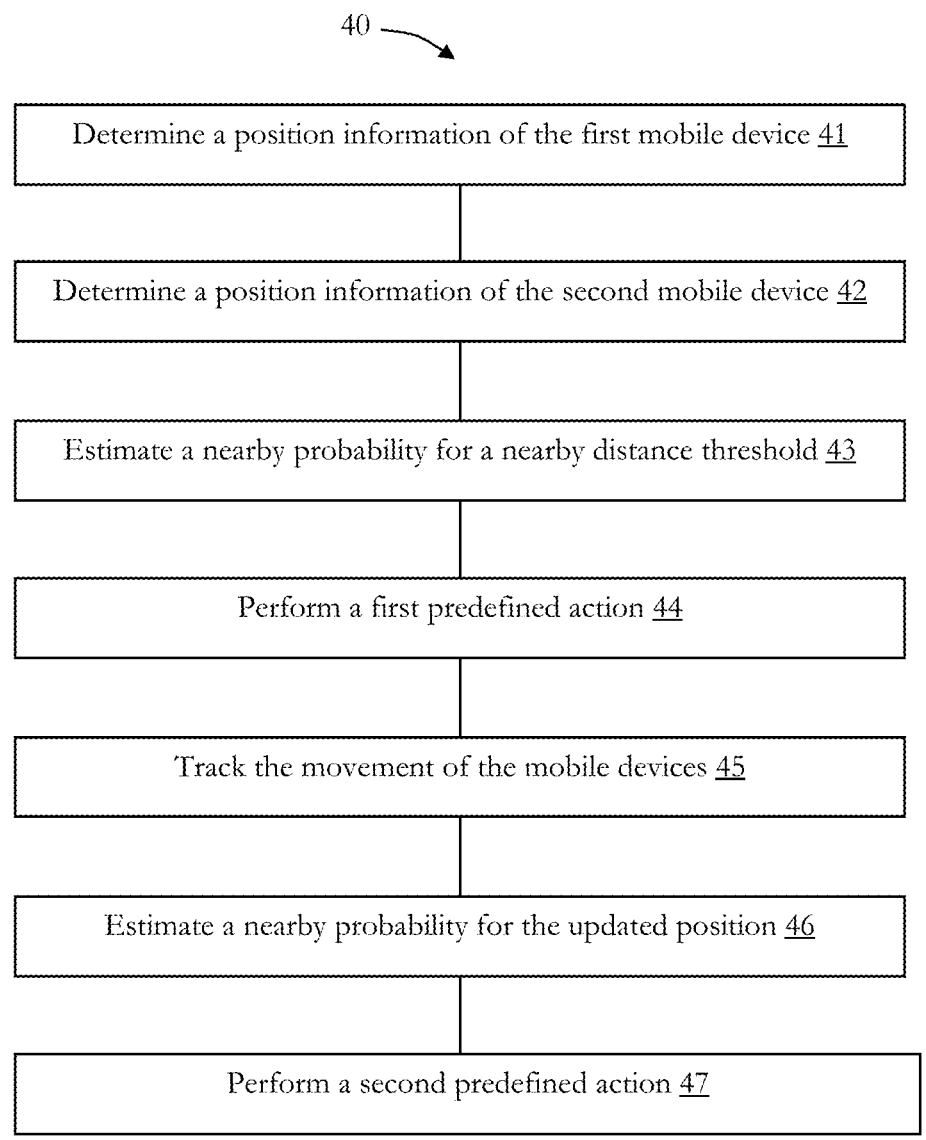
FIG. 7 is a flowchart of an embodiment of a method for determining a probability for a distance between a smartphone and a wristband and tracking the movement of the smartphone and the wristband.

In the following an embodiment of a method 40 (e.g. in the form of a computer program) which may be performed by the smartphone 10 and/or the wristband 2 will be discussed, with reference to FIG. 7.

At 41, a user (child) Luke is at basketball practice while wearing the wristband 2. After hitting the shower he heads out to the parking lot to meet his dad. The circuitry 11 determines a position information of the wristband 2 of the Luke. The wristband 2 estimates its GPS location and provides it to the circuitry 11. A program running on the circuitry 11 determines a longitude, a latitude and an accuracy parameter as position information of the wristband 2.

At 42, the circuitry 11 determines a position information of the smartphone 10 of Luke's father, as discussed above.

The smartphone 10 of Luke's father estimates its GPS location and provides it to the circuitry 11. The program running on the circuitry 11 determines a longitude, a latitude and an accuracy parameter as position information of the smartphone 10 of Luke's father.

At 43, the circuitry 11 estimates a probability for a nearby distance threshold. The nearby distance threshold is 30 meters. The program running on the circuitry 11 estimates the nearby probability. The nearby probability is estimated based on the full Bayesian model as discussed above and based on the estimated position information of the wristband 2 of Luke, and the smartphone 10 of Luke's father.

The estimated probability for having a distance of 30 meters is 0.1.

Moreover, it seems that Ron (Luke's father) is late and is not at the parking lot to meet his son, because he is stuck in traffic, but is definitely on his way.

At 44, the circuitry 11 performs a first predefined action. The program running on the circuitry 11 evaluates the estimated probability of 0.1 and performs a predefined action. The predefined action is to inform Luke that his father will be late.

Luke receives a notification message on his wristband and is informed.

Moreover, Luke decides to do some extra practice and shoots some hoops while waiting for his father.

At 45, the circuitry tracks the movement of the wristband 2 of Luke and the smartphone 10 of Luke's father. The smartphone 10 and the wristband 2 continuously determine their location based on their respective GPS sensors. Moreover, the smartphone 10 and the wristband 2 provide their last determined location information to the circuitry 11. The program running on the circuitry 11 updates the estimated position information for the smartphone 10 and the wristband 2.

At 46, Ron drives into the parking lot and the smartphone 10 updates his position information. The circuitry 11 estimates a nearby probability, based on the updated position information, as discussed above. The nearby probability is 0.99 for the nearby distance threshold of 30 meter.

At 47, the circuitry 11 performs a second predefined action and Luke is notified of his father's arrival in the parking, as discussed above.

In the following, another example of an embodiment of a method 40 which may be performed by the smartphone 10 will be discussed, with reference to FIG. 7, assuming another situation.

The method 40 is performed by the circuitry 11 of the smartphone 10, wherein a nearby distance threshold of 30 meter between the smartphone 10 and the wristband 2 is considered.

At 41, a user Alice (child) is wearing the wristband 2 and has managed to get away from her mother Carol (other user). Carol is carrying the smartphone 10.

The circuitry 11 determines a position information of the smartphone 10 of Carol, as discussed above.

At 42, the circuitry 11 determines a position information of the wristband 2 of Alice, as discussed above.

At 43, the circuitry 11 estimates a nearby probability for a nearby distance threshold of 30 meters and based on the position information of the wristband 2 of Alice and smartphone 10 of Carol, as discussed above.

At 44, Carol is actively looking for Alice, but still Alice is feeling bad, since she is lost.

The circuitry 11 performs a first predefined action which is a "Push to talk".

The predefined action is requesting Alice to press the "talk" button on her wristband, which puts her immediately in touch with the closest adult to her.

Moreover, the circuitry 11 provides Carol (e.g. on the touch screen of the smartphone 10) with the GPS location of the Alice's wristband 2, as discussed above.

Carol consoles Alice and tells her to make sure she is safe on the pavement, and then to stay put while she's coming to pick her up.

In the following, another example of an embodiment of a method 40, which may be performed by the smartphone 10 will be discussed, with reference to FIG. 7, assuming a another situation.

The method 40 is performed by the circuitry 11 of the smartphone 10, wherein a nearby distance threshold of 30 meters between the smartphone 10 and the wristband 2 is considered.

At 41, a user Luke (child) is wearing the wristband 2 and cycles home from school by himself.

Today, his friend Ronald invites him over to play a game called Little Big Planet, which sounds like a great idea to Luke.

The circuitry 11 determines a position information of the wristband 2, as discussed above.

At 42, Luke's mother Carol carrying the smartphone 10, is driving home. The circuitry 11 determines a position information of the smartphone 10 of Carol, as discussed above.

At 43, the circuitry 11 estimates a probability for a nearby distance threshold, as discussed above. The nearby distance threshold is 30 meters.

At 44, the circuitry 11 perform a first predefined action, as discussed above. Carol receives a notification on the smartphone 10 and will be notified that Luke is making a side trip and will stay with Ronald for a while.

At 45, the circuitry tracks the movement of the mobile devices, as discussed above, and Carol arrives home.

At 46, the circuitry 11 estimates a nearby probability for the nearby distance threshold, based on the updated position information, as discussed above.

At 47, the circuitry 11 performs a second predefined action. Carol requests the circuitry to send such a notification: "Please make sure to be home by 5!".

Moreover, a notification appears on a game console screen telling Luke that it is time to go home.

In the following, an embodiment of a method 40 which may be performed by the smartphone 10 will be discussed, with reference to FIG. 7.

The method 40 is performed by the circuitry 11 of the smartphone 10, wherein a nearby distance threshold of 30 meter between the smartphone 10 and the wristband 2 is monitored.

At 41, a user Ron (parent, father) is carrying the smartphone 10 and Carol (parent, mother) is wearing the wristband 2.

Moreover, Ron and Alice (child) are cooking while Carol and Luke (child) are at the mall. Vegetables are chopped and a lasagna is ready to go into the oven.

The circuitry 11 determines a position information of the smartphone 10 of Ron, as discussed above. The smartphone 10 estimates its GPS location and provides it to the circuitry 11. A program running on the circuitry 11 determines a longitude, a latitude and an accuracy parameter as position information of the smartphone 10, as discussed above.

At 42, the circuitry 11 determines position information of the wristband 2 of Carol, as discussed above. The wristband 2 estimates its GPS location and provides it to the circuitry 11, as discussed above. The program running on the circuitry 11 determines a longitude, a latitude and an accuracy parameter as position information of the second mobile device.

At 43, at the mall, Carol finds out that the dress she was looking for was sold out. She now has to head to the other side of town to another shop.

The circuitry 11 estimates a nearby probability for a nearby distance threshold, as discussed above. The nearby distance threshold is 30 meters. The program running on the circuitry 11 estimates the nearby probability for the nearby distance threshold of 30 meters. The nearby probability is estimated to be 0.2.

At 44, the circuitry 11 performs a first predefined action, as discussed above. As Ron wants to put the lasagna in the oven, he receives a notification on his smartphone 10 that Carol will be delayed by an hour.

Moreover, Ron places the lasagna on the kitchen table and decides to wait a while before putting it into the oven.

At 45, the circuitry tracks the movement of the mobile devices, as discussed above. The smartphone 10 and the wristband 2 continuously determine their location based on their respective GPS sensors. Moreover, the smartphone 10 and the wristband 2 provide their last determined location information to the circuitry 11. The program running on the circuitry 11 updates the estimated position information for the smartphone 10 and the wristband 2.

At 46, the circuitry 11 estimates a nearby probability for the nearby distance threshold, based on the updated position information, as discussed above. The program running on the circuitry 11 estimates the probability, based on the updated position information and for the nearby distance threshold of 30 meter.

At 47, the circuitry 11 performs a second predefined action, as discussed above. Ron will be informed by a notification on his smartphone 10 that Carol is a distance of 30 meter from him.

It should be recognized that the embodiments describe methods with an exemplary ordering of method steps. The specific ordering of method steps is however given for illustrative purposes only and should not be construed as binding. For example, the ordering of 33 and 34 in the embodiment of FIG. 6 may be exchanged. Also the ordering of 32, 33 and 34 in the embodiment of FIG. 6 may be exchanged. Further, also the ordering of 44 and 45 in the embodiment of FIG. 7 may be exchanged. Other changes of the ordering of method steps may be apparent to the skilled person.

Please note that the division of the circuitry 11 into units 12 to 19 is only made for illustration purposes and that the present disclosure is not limited to any specific division of functions in specific units. For instance, the circuitry 11 could be implemented by a respective programmed processor, field programmable gate array (FPGA) and the like.

The methods described herein can also be implemented as a computer program causing a computer and/or a processor (circuitry), such as processor 15 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

Insofar as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device, comprising:
a tracking unit configured to track a movement of a first mobile device and a movement of a second mobile device, based on a position of the first mobile device and a position of the second mobile device received from a position estimation unit;
a determination unit configured to determine a probability distribution of a distance between the first mobile device and the second mobile device, based on a probabilistic model, and the position of the first mobile device and the position of the second mobile device; and an action unit configured to perform action, based on the determined probability distribution of the distance.

(2) The electronic device of (1), further comprising a nearby detection unit configured to deter-mine whether the first mobile device and the second mobile device are nearby, based on determining a nearby probability, which is computed based on the probability distribution of the distance for distances below a nearby distance threshold.

(3) The electronic device of (1) or (2), wherein the determination of nearby includes determining whether the determined nearby probability is above a nearby probability threshold.

(4) The electronic device of anyone of (1) to (3), wherein the action unit is further configured to perform an action based on a tracking result provided by the tracking unit.

(5) The electronic device of anyone of (1) to (4), further comprising a position estimation unit configured to estimate a movement speed of the first mobile device and a movement speed of the second mobile device.

(6) The electronic device of anyone of (1) to (5), wherein the nearby detection unit is further configured to determine whether the first mobile device and the second mobile device are nearby, based on the estimated movement speed of the first mobile device and the estimated movement speed of the second mobile device.

(7) The electronic device of anyone of (1) to (6), wherein the action unit is further configured to provide an alert notification, based on the nearby detection unit determining whether the first mobile device and the second mobile device are nearby.

(8) The electronic device of anyone of (1) to (7), wherein the action unit is further configured to provide a navigation instruction, wherein the navigation instruction is provided when the nearby detection unit determining the first mobile device and the second mobile device are not nearby, and wherein the navigation instruction includes a direction instruction from a position of a first mobile device to a position of a second mobile device.

(9) The electronic device of anyone of (1) to (8), further comprising a communication interface configured to establish a wireless communication between the first mobile device and the second mobile device.

(10) The electronic device of anyone of (1) to (9), wherein the probabilistic model includes a prior probability distribution representing a distribution before evaluating location data of the first mobile device and the second mobile device, and a posterior probability distribution representing a distribution after evaluating the location data of the first mobile device and the second mobile device.

(11) A method comprising:
tracking a movement of a first mobile device and a movement of a second mobile device, based on a position of the first mobile device and a position of the second mobile device received from a position estimation unit;
determining a probability distribution of a distance between the first mobile device and the second mobile device, based on a probabilistic model, and the position of the first mobile device and the position of the second mobile device; and
performing action, based on the determined probability distribution of the distance.

(12) The method of (11), further comprising determining whether the first mobile device and the second mobile device are nearby, based on determining a nearby probability, which is computed based on the probability distribution of the distance for distances below a nearby distance threshold.

(13) The method of (11) or (12), further comprising determining whether the determined nearby probability is above a nearby probability threshold.

(14) The method of anyone of (11) to (13), further comprising performing an action based on a tracking result provided by the tracking unit.

(15) The method of anyone of (11) to (14), further comprising estimating a movement speed of the first mobile device and a movement speed of the second mobile device.

(16) The method of anyone of (11) to (15), further comprising determining whether the first mobile device and the second mobile device are nearby, based on the estimated movement speed of the first mobile device and the estimated movement speed of the second mobile device.

(17) The method of anyone of (11) to (16), further comprising providing an alert notification, based on the nearby detection unit determining whether the first mobile device and the second mobile device are nearby.

(18) The method of anyone of (11) to (17), further comprising providing a navigation instruction, wherein the navigation instruction is provided when the nearby detection unit determining the first mobile device and the second mobile device are not nearby, and wherein the navigation instruction includes a direction instruction from a position of a first mobile device to a position of a second mobile device.

(19) The method of anyone of (11) to (18), further comprising establishing a wireless communication between the first mobile device and the second mobile device.

(20) The method of anyone of (11) to (19), wherein the probabilistic model includes a prior probability distribution representing a distribution before evaluating location data of the first mobile device and the second mobile device, and a posterior probability distribution representing a distribution after evaluating the location data of the first mobile device and the second mobile device.

(21) A method comprising:
determining a nearby probability for a distance between a first mobile device and a second mobile device, based on a probabilistic model.

(22) The method of (21), wherein the probabilistic model includes a prior probability distribution representing a distribution before evaluating location data of the first mobile device and the second mobile device, and a posterior probability distribution representing a distribution after evaluating the location data of the first mobile device and the second mobile device.

(23) The method of (21) or (22), wherein the posterior probability distribution is estimated based on the prior probability distribution.

(24) The method of anyone of (21) to (23), wherein the posterior probability distribution is estimated based on a first likelihood function and a second likelihood function.

(25) The method of anyone of (21) to (24), wherein the first likelihood function includes a density function for calculating a position density based on a position information of the first mobile device and a position information of the second mobile device.

(26) The method of anyone of (21) to (25), wherein the first likelihood function is estimated, based on a Rice distribution function according to $$\mathrm{Rice}(d,\ (\sigma_1^2+\sigma_2^2)^{1/2})\cdot\mathrm{pdf}(h),$$

wherein d is a distance between the first mobile device and the second mobile device, $\sigma_1$ is a variance parameter corresponding to the accuracy parameter for the position information of the first mobile device, $\sigma_2$ is a variance parameter corresponding to the accuracy parameter for the position information of the second mobile device, and pdf(h) is the value of the probability density function at a haversine distance between the locations of the first mobile device and the second mobile device.

(27) The method of anyone of (21) to (26), wherein the second likelihood function includes a density function for calculating a wireless communication stations density, based on detected wireless communication stations by the first mobile device and the second mobile device.

(28) The method of anyone of (21) to (27), wherein the second likelihood function is estimated, based on $$\log p(a, b, c|d) = (a+b) \times \log(\pi r^2 - \theta_{dr}) + c \times \log(\theta_{dr}) + \lambda \times \theta_{dr},$$

wherein p(a, b, c|d) is the second likelihood function, a is an observed value for a number of the wireless communication stations detected only by the first mobile device, b is an observed value for a number of the wireless communication stations detected only by the second mobile device, c is an observed value for a number of the wireless communication stations detected by both of the first mobile device and the second mobile device, r is a radius of the wireless communication detection area, $\lambda$ is a density of the wireless communication stations, and $\theta$ is a geometric function for an area of intersection having wireless communication stations that are detectable by both of the first mobile device and the second mobile device.

(29) The method of anyone of (21) to (28), wherein the prior probability distribution is estimated based on a half-Cauchy function and/or the nearby probability for the distance is determined based on a cumulative density function of the posterior probability distribution.

(30) The method of anyone of (21) to (29), further comprising performing a predefined action in response to evaluating whether the determined nearby probability is above a nearby probability threshold.

(31) An electronic device comprising circuitry configured to:
determine a nearby probability for a distance between a first mobile device and a second mobile device, based on a probabilistic model.

(32) The electronic device of (31), wherein the probabilistic model includes a prior probability distribution representing a distribution before evaluating location data of the first mobile device and the second mobile device, and a posterior probability distribution representing a distribution after evaluating the location data of the first mobile device and the second mobile device.

(33) The electronic device of (31) or (32), wherein the circuitry is further configured to estimate the posterior probability distribution based on the prior probability distribution.

(34) The electronic device of anyone of (31) to (33), wherein the circuitry is further configured to estimate the posterior probability distribution based on a first likelihood function and a second likelihood function.

(35) The electronic device of anyone of (31) to (34), wherein the first likelihood function includes a density function for calculating a position density based on a position information of the first mobile device and a position information of the second mobile device.

(36) The electronic device of anyone of (31) to (35), wherein the circuitry is further configured to estimate the first likelihood function based on a Rice distribution function according to $$\text{Rice}(d, (\sigma_1^2 + \sigma_2^2)^{1/2}) \cdot \text{pdf}(h),$$

wherein d is a distance between the first mobile device and the second mobile device, $\sigma_1$ is a variance parameter corresponding to the accuracy parameter for the position information of the first mobile device, $\sigma_2$ is a variance parameter corresponding to the accuracy parameter for the position information of the second mobile device, and pdf(h) is the value of the probability density function at a haversine distance between the locations of the first mobile device and the second mobile device.

(37) The electronic device of anyone of (31) to (36), wherein the second likelihood function includes a density function for calculating a wireless communication stations density, based on detected wireless communication stations by the first mobile device and the second mobile device.

(38) The electronic device of anyone of (13) to (37), wherein the circuitry is further configured to estimate the second likelihood function based on $$\log p(a, b, c|d) = (a+b) \times \log(\pi r^2 - \theta_{dr}) + c \times \log(\theta_{dr}) + \lambda \times \theta_{dr},$$

wherein p(a, b, c|d) is the second likelihood function, a is an observed value for a number of the wireless communication stations detected only by the first mobile device, b is an observed value for a number of the wireless communication stations detected only by the second mobile device, c is an observed value for a number of the wireless communication stations detected by both of the first mobile device and the second mobile device, r is a is a radius of the wireless communication detection area, $\lambda$ is a density of the wireless communication stations, and $\theta$ is a geometric function for an area of intersection having wireless communication stations that are detectable by both of the first mobile device and the second mobile device.

(39) The electronic device of anyone of (31) to (38), wherein the prior probability distribution is estimated based on a half-Cauchy function and/or the nearby probability for the distance is determined based on a cumulative density function of the posterior probability distribution.

(40) The electronic device of anyone of (31) to (39), wherein the circuitry is further configured to perform a predefined action in response to evaluating whether the determined nearby probability is above a nearby probability threshold.

(41) A computer program comprising program code causing a computer to perform the method according to anyone of (11) to (20) and/or anyone of (21) to (30), when being carried out on a computer.

(42) A non-transitory computer-readable recording medium that stores therein a computer program product, which, when executed by a processor, causes the method according to anyone of (11) to (20) and/or anyone of (21) to (30) to be performed.

The invention claimed is:

1. A first mobile device comprising circuitry configured to:
receive a position of the first mobile device and a position of a second mobile device;
track a movement of the first mobile device and a movement of the second mobile device based on the received position of the first mobile device and the received position of the second mobile device;

determine a probability distribution of a distance between the first mobile device and the second mobile device based on a probabilistic model, the received position of the first mobile device, and the received position of the second mobile device; and perform an action based on the determined probability distribution of the distance.

2. The first mobile device of claim 1, wherein the circuitry is further configured to:

determine a nearby probability based on the probability distribution of the distance for distances below a nearby distance threshold; and determine where the first mobile device and the second mobile device are nearby based on the determined nearby probability, and wherein the circuitry is a processor.

3. The first mobile device of claim 2, wherein the circuitry is further configured to determined where the nearby probability is above a nearby probability threshold.

4. The first mobile device of claim 2, wherein the circuitry is further configured to estimate a movement speed of the first mobile device and a movement speed of the second mobile device.

5. The first mobile device of claim 4, wherein the circuitry is further configured to determine whether the first mobile device and the second mobile device are nearby based on the estimated movement speed of the first mobile device and the estimated movement speed of the second mobile device.

6. The first mobile device of claim 5, wherein the circuitry is further configured to provide an alert notification based on whether the first mobile device and the second mobile device are determined to be nearby.

7. The first mobile device of claim 5, wherein the circuitry is further configured to provide a navigation instruction, wherein the navigation instruction is provided when the first mobile device and the second mobile device are determined not to be nearby, and wherein the navigation instruction includes a direction instruction from a position of the first mobile device to a position of the second mobile device.

8. The first mobile device of claim 1, wherein the circuitry is further configured to perform an action based on a tracking result provided by the tracking unit.

9. The first mobile device of claim 1, further comprising a communication interface configured to establish a wireless communication between the first mobile device and the second mobile device.

10. The first mobile device of claim 1, wherein the probabilistic model includes a prior probability distribution representing a distribution before evaluating location data of the first mobile device and the second mobile device, and a posterior probability distribution representing a distribution after evaluating the location data of the first mobile device and the second mobile device.

11. A method comprising:

receiving a position of a first mobile device and a position of a second mobile device;

tracking a movement of the first mobile device and a movement of the second mobile device based on the received position of the first mobile device and the received position of the second mobile device;

determining a probability distribution of a distance between the first mobile device and the second mobile device based on a probabilistic model, the position of the first mobile device, and the position of the second mobile device; and performing an action based on the determined probability distribution of the distance.

12. The method of claim 11, further comprising:

determining a nearby probability, based on the probability distribution of the distance for distances below a nearby distance threshold; and determining where the first mobile device and the second mobile device are nearby based on the determined neary probability.

13. The method of claim 12, further comprising determining whether the determined nearby probability is above a nearby probability threshold.

14. The method of claim 12, further comprising estimating a movement speed of the first mobile device and a movement speed of the second mobile device.

15. The method of claim 14, further comprising determining whether the first mobile device and the second mobile device are nearby based on the estimated movement speed of the first mobile device and the estimated movement speed of the second mobile device.

16. The method of claim 15, further comprising providing an alert notification based on whether the first mobile device and the second mobile device are determined to be nearby.

17. The method of claim 15, further comprising providing a navigation instruction, wherein the navigation instruction is provided when the the first mobile device and the second mobile device are determined not to be nearby, and wherein the navigation instruction includes a direction instruction from a position of the first mobile device to a position of the second mobile device.

18. The method of claim 11, further comprising performing an action based on a tracking result provided by the tracking unit.

19. The method of claim 11, further comprising establishing a wireless communication between the first mobile device and the second mobile device.

20. The method of claim 11, wherein the probabilistic model includes a prior probability distribution representing a distribution before evaluating location data of the first mobile device and the second mobile device, and a posterior probability distribution representing a distribution after evaluating the location data of the first mobile device and the second mobile device.

* * * * *